United States Patent [19]

Antonov et al.

[11] 4,241,269
[45] Dec. 23, 1980

[54] DIRECTLY LIQUID COOLED ROTOR FOR ELECTRICAL MACHINE

[76] Inventors: Jury F. Antonov, ulitsa Novostroek, 10, kv. 42; Ibragim A. Kadi-Ogly, prospekt Marshala Zhukova, 64, korpus 1; Boris K. Perchanok, ulitsa Saltykova-Schedrina, 17, kv. 54; Pavel I. Chashnik, Dunaisky prospekt, 42/79, kv. 167, all of Leningrad, U.S.S.R.

[21] Appl. No.: 919,786

[22] Filed: Jun. 28, 1978

[51] Int. Cl.³ .................................. H02K 1/32
[52] U.S. Cl. .................................. 310/61; 310/53
[58] Field of Search ............... 310/54, 58, 59, 60, 310/61, 64, 65, 53

[56] References Cited

U.S. PATENT DOCUMENTS

| 3,131,321 | 4/1964 | Gibbs | 310/54 |
| 3,821,569 | 6/1974 | Sippol | 310/64 |
| 3,870,913 | 3/1975 | Shapiro | 310/54 |
| 3,891,877 | 6/1975 | Shapiro | 310/61 |
| 3,955,111 | 5/1976 | Weghaupt | 310/54 |

Primary Examiner—R. Skudy
Attorney, Agent, or Firm—Steinberg & Raskin

[57] ABSTRACT

A rotor for electrical machine comprises poles and a winding made of hollow conductors forming hydraulic loops connected in parallel to a cooling liquid supply system, in each hydraulic loop a conductor for discharging cooling liquid is disposed at a greater distance from the rotor axis than a conductor for supplying cooling liquid, and is fitted with a bent tip capable of rotation around the axis of said conductor.

1 Claim, 3 Drawing Figures

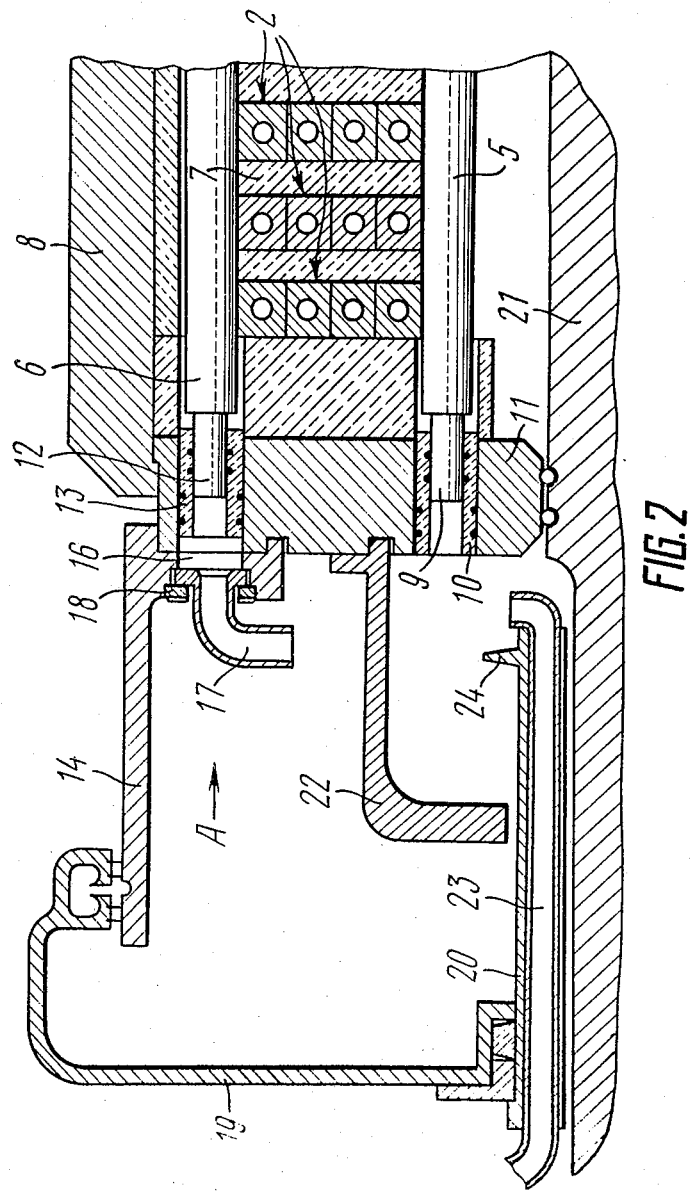

DIRECTLY LIQUID COOLED ROTOR FOR ELECTRICAL MACHINE

FIELD OF THE INVENTION

The present invention relates to electrical machines, and more particularly to directly liquid cooled rotors for electrical machines.

The present invention can most advantageously be used in non-salient pole rotors for turbogenerators.

BACKGROUND OF THE INVENTION

Known in the art is a directly liquid cooled rotor for an electrical machine (cf. British Pat. No. 1,416,765), comprising a non-salient pole rotor body and a winding consisting of coils arranged within the respective slots formed in the rotor body and electrically connected mutually in series. Each one of the coils is made of hollow conductors to form a hydraulic loop, the cooling liquid being fed therethrough. In each of the hydraulic loops its lower or radially inner lead serves as an inlet for supplying the cooling liquid into the hydraulic loop, while its upper or radially outer lead serves as an outlet for draining the cooling liquid from said loop. Thus, the conductor for draining the cooling liquid is positioned at a greater distance from the axis of the rotor than the conductor lead for supplying the cooling liquid. The conductors for supplying and draining the cooling liquid are in communication with a cooling liquid supply line via metal tubes arranged coaxially with respect to said conductors, all the hydraulic loops being thus connected mutually in parallel.

It is common knoledge that the rotor cooling depends upon the flow rate of the cooling liquid passing through the hydraulic loops. The flow rate of the cooling liquid in the hydraulic loop is a function of the head of the liquid and of the resistance of the hydraulic loop to the liquid flow, the head depending upon the difference between the draining level and the supply level with respect to the rotor axis, while the resistance to the cooling liquid flow is defined in general by the cross-sectional area of the cooling ducts and their total length. Inasmuch as in the prior art rotor the cooling liquid is supplied into the hydraulic loops at the same distance from the rotor axis and is drained also at the same distance from the rotor axis as well, the circulation of the cooling liquid in all the hydraulic loops is effected with the same head. The flow rate of the liquid, however, can be different in the symmetrically arranged hydraulic loops, resulting from deviations in diameter of the hydraulic loop ducts, different distances between the coils and the rotor surface, and different thicknesses of coil conductor insulators. All this leads to a non-symmetrical cooling of the rotor and to thermal unbalance depending upon the load of the electrical machine. As a result, the axis of rotation of the rotor displaces from its nominal position due to added thermal deformations, and the rotor shaft vibrates in its bearings, this substantially decreasing the reliability of the electrical machine. Under variable load conditions of the electrical machine operation the thermal unbalance cannot be eliminated by using balance weights fixed on the rotor.

SUMMARY OF THE INVENTION

It is an object of the present invention to eliminate thermal unbalance of the directly liquid cooled rotor for electrical machine by controlling the flow rate of the cooling liquid flowing through its hydraulic loops.

With this and other objects in view, there is proposed a directly liquid cooled rotor for an electrical machine, comprising poles and a winding made of hollow conductors forming hydraulic loops hydraulically connected in parallel to a cooling liquid supply system, a conductor for discharging cooling liquid of each hydraulic loop being disposed at a greater distance from the rotor axis than a conductor for supplying the cooling liquid, wherein, according to the invention, the conductor for discharging cooling liquid from each hydraulic loop is fitted with a bent tip capable of rotation around the axis of said conductor.

The advantage of the present invention consists in that it enables the distance between the outlet hole of said tip and the rotor axis of the loop where the thermal unbalance is observed, to be altered by rotating the bended tip, and hence, the flow rate of the cooling liquid passing through said loop to be changed, thus eliminating thermal unbalance.

A rotor embodying the invention will now be particularly described, by way of explanation, with reference to the accompanying diagrammatic drawings in which:

BRIEF DESCRIPTION OF THE DRAWINGS

FIG. 2 is a longitudinal section of a portion of the rotor shown in FIG. 1, adjacent to one end thereof, accommodating the outlets of the hydraulic loop.

DETAILED DESCRIPTION OF THE INVENTION

Figure 1:
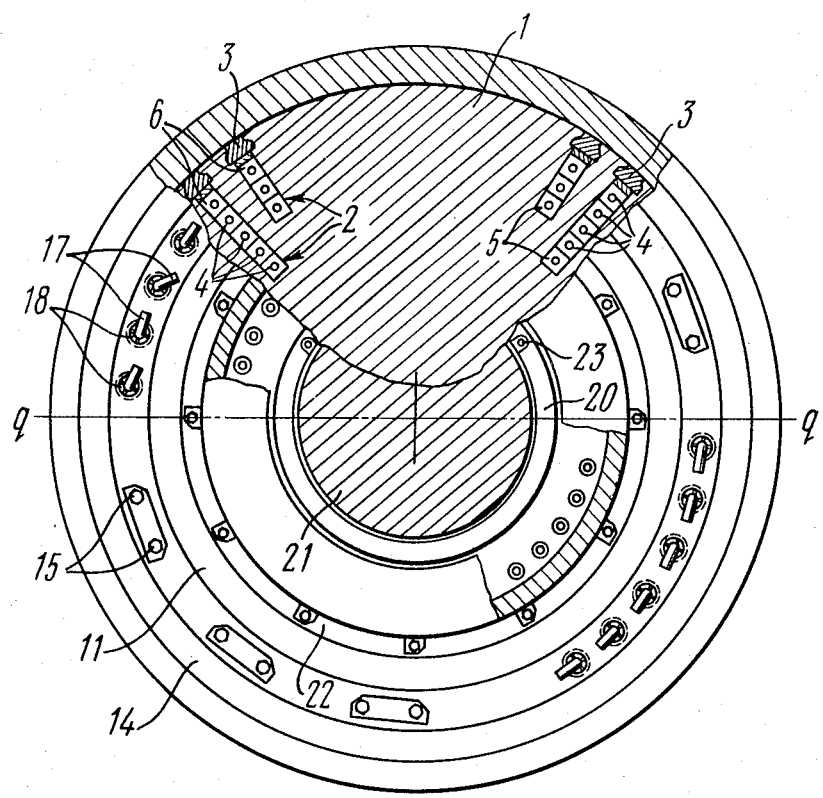
FIG. 1 shows a directly liquid cooled rotor for electrical machine, according to the invention, end view, partly broken away, with the body of the cooling liquid supply system removed.

The proposed directly liquid cooled rotor for electrical machine comprises a rotor body having non-salient poles 1 (FIG. 1) and a winding which comprises coils 2 electrically connected mutually in series and located in respective slots formed in the rotor body. The coils 2 are retained against radial displacement by slot wedges 3. The coils 2 are formed by hollow conductors 4, 5, 6 whose ducts are intended to pass cooling liquid therethrough. The conductors 4, 5, 6 form hydraulic loops, the conductor 5 of each of said loops being used for supplying the cooling liquid into the hydraulic loop, while the conductor 6 is used to discharge the cooling liquid therefrom. As it can be seen in FIG. 1, the conductors 6 for discharging the cooling liquid are positioned at a greater distance from the rotor axis than the conductors 5 for supplying the liquid.

In the preferred embodiment of the invention each one of the hydraulic loops is formed by the conductors 4, 5, 6 of one coil 2. However, it will be apparent to those skilled in the art, that each hydraulic loop can be formed by conductors of several coils or only by part of one coil. The essential requirement is that the hydraulic loops arranged symmetrically with respect to the lateral axis "q" should be similar in configuration.

Shown in FIG. 2 is a longitudinal section of a portion of the rotor adjacent to one end thereof. The conductor 5 for supplying the cooling liquid and the conductor 6 for discharging the cooling liquid are disposed axially outside the end portions of the coils 2 separated by spacers 7. The coil end portions and the conductors 5, 6 are prevented from radial displacement by a retaining ring 21.

The conductors 5 for supplying cooling liquid are connected with respective metal tubes 9. The tubes 9 pass into respective tubes 10 made of electrically insulating material and fixed in cylindrical holes formed in a thrust ring 11.

The conductors 6 for discharging cooling liquid are connected to respective metal tubes 12 passing into respective tubes 13 made of electrically insulating material and fixed in cylindrical holes formed in the thrust ring 11. A drain ring 14 is bolted to the thrust ring 11 at 15 (FIG. 1). Cylindrical holes 16 (FIG. 2) of the drain ring 14 are coaxial with the longitudinal axis of tubes 12, 13 and with the conductors 6 for discharging the liquid. Bent tips or pipes 17 are fitted into the cylindrical holes 16 of the drain ring 14 and are capable of rotation around the axis of the respective conductor 6 for discharging cooling liquid, as shown by an arrow in FIG. 3, and are locked by nuts 18. Thus each of the bent pipes 17 has an open end which forms the outlet of the respective discharging passage, defined by conductor 6, tubes 12 and 13, in which it is fitted.

The hydraulic loops via the tips 17 (FIG. 2) and tubes 10 are connected in parallel to the cooling liquid supply system comprising a body 19 with an annular member 20 sealingly mounted therein, a collector facing the rotor shaft 21, said collector being defined by the thrust ring 11 and a profiled ring 22, and the drain ring 14.

Ducts 23 provided in the annular member 20 are intended to admit the cooling liquid into the profiled ring 22. An annular projection 24 seals the body 19 of the cooling liquid supply system from the air surrounding the rotor shaft 21.

When the rotor is rotating, the cooling liquid flows through the ducts 23 of the annular member 20 into the profiled ring 22 of the collector and, due to rotation of the rotor, passes through the tubes 9, 10 into the conductor 5 for supplying cooling liquid. The centrifugal forces then drive the liquid through the hollow conductors 4 (FIG. 1) along the hydraulic loops. The liquid is discharged through the conductors 6 (FIG. 2), tubes 13, 12 and tips 17 onto the inner surface of the drain ring 14, and then flows along this surface and into the body 19 of the cooling liquid supply system.

The hydraulic head of the cooling liquid flowing along the hydraulic loops is provided by virtue of difference in distances between the outlet holes of the respective tips 17 and the rotor axis, and the inlet holes of the tubes 10 and the rotor axis. The flow rate of the liquid passing through the hydraulic loops is a function of the head of the liquid and of the resistance of these loops to the liquid flowing therethrough.

Ideally, i.e. when each pair of the hydraulic loops disposed symmetrically with respect to the lateral axis "q" (FIG. 1) of the rotor is fully identical, the flow rate in each pair of symmetrically disposed loops will be the same, this resulting in symmetrical cooling of the rotor.

Figure 3:
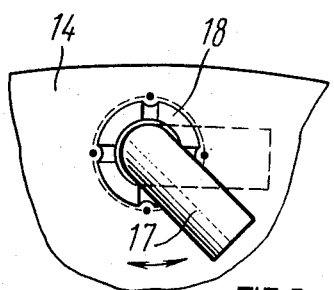
FIG. 3 is an enlarged view taken along the arrow A in FIG. 2.

Before electrical machine starting all the tips 17 are set to tangential position, as shown with a dotted line in FIG. 3. If any thermal unbalance is observed during the electrical machine operation, caused, for example, by overheating of that portion of the rotor where the hydraulic loop is formed by the smallest coil 2 (FIG. 1) adjacent to the pole 1, the tip 17 of the conductor for discharging cooling liquid from the symmetrical hydraulic loop formed by the smallest coil 2 adjacent to the opposite pole (not shown), is turned downwards in order to change the distance between its outlet and the rotor axis so as to change the flow rate in this hydraulic loop, and, as a result, to eliminate thermal unbalance, then the tip 17 is fixed in position by the nut 18 (FIG. 3).

The proposed invention ensures a simple and reliable method for controlling the flow rate of the liquid when the electrical machine is both under test and operation, the range of flow rate control being sufficient to eliminate thermal unbalance under typical operating conditions of the machine.

The present invention should be comprehended in all of its alternative embodiments and should not be limited to the specific exemplary embodiment heretofore described. It will be understood that the invention may be embodied otherwise. Thus, the construction of the rotor may be different from that described above, for example, the rotor may have serient poles. The hydraulic loops can be formed not by an exciting winding, but by a damper one. The rotor of the invention can be used in conjunction with a variety of cooling liquid supply systems in addition to that described above, for example cooling systems wherein cooling liquid is supplied through respective passages provided in the rotor shaft.

What is claimed is:

1. A directly liquid cooled rotor for an electrical machine comprising
    a body having an axis;
    a plurality of poles which are circumferentially spaced from each other;
    a winding including a plurality of electrically connected coils which are circumferentially spaced from each other and operatively cooperate with said poles, each of said coils having a plurality of passages arranged for passing a cooling liquid therethrough, said passages communicating with each other so as to form a plurality of hydraulic loops each of which includes a passage for supplying the cooling liquid located at a radially smaller distance and a passage for discharging the cooling liquid located at a radially greater distance from said axis, each of said passages for discharging the cooling liquid having axis; and
    a plurality of bent pipes, each of which is fitted in a respective one of said discharging passages and having an open end forming the outlet of said respective discharging passage in which it is fitted, each of said bent pipes being rotatable relative to the axis of said respective discharging passage so that said open end of each of said pipes which forms the outlet of the respective passage can be radially displaced relative to said axis of said body.

* * * * *